(12) United States Patent
Hamauchi

(10) Patent No.: US 10,847,929 B2
(45) Date of Patent: Nov. 24, 2020

(54) CONNECTOR CAGE AND ELECTRONIC DEVICE INCLUDING A PUSH PLATE

(71) Applicant: FUJITSU LIMITED, Kawasaki-shi, Kanagawa (JP)

(72) Inventor: Norio Hamauchi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/535,057

(22) Filed: Aug. 7, 2019

(65) Prior Publication Data
US 2020/0067230 A1 Feb. 27, 2020

(30) Foreign Application Priority Data

Aug. 27, 2018 (JP) .................................. 2018-158705

(51) Int. Cl.
| | |
|---|---|
| H01R 13/62 | (2006.01) |
| H01R 13/533 | (2006.01) |
| H01R 13/627 | (2006.01) |
| H01R 13/73 | (2006.01) |

(52) U.S. Cl.
CPC ....... H01R 13/533 (2013.01); H01R 13/6272 (2013.01); H01R 13/73 (2013.01)

(58) Field of Classification Search
CPC ............ H01R 23/7068; H01R 23/7005; H01R 13/633; H01R 23/722; H01R 13/658; H01R 23/6873; H05K 9/0058; H01L 23/4093; G06F 1/20
USPC ............. 439/59, 60, 64, 152, 160, 327–329, 439/607.04, 607.13, 607.21; 361/704, 361/709, 715, 716
See application file for complete search history.

(56) References Cited

U.S. PATENT DOCUMENTS

| | | | | |
|---|---|---|---|---|
| 7,733,652 B2* | 6/2010 | Costello | ............... | H05K 5/0286 |
| | | | | 165/185 |
| 7,764,504 B2* | 7/2010 | Phillips | ................ | G02B 6/4246 |
| | | | | 165/80.2 |
| 7,833,068 B2* | 11/2010 | Bright | .................. | H01R 13/502 |
| | | | | 439/733.1 |
| 8,823,540 B2* | 9/2014 | Scholeno | ............. | H01R 12/716 |
| | | | | 340/815.4 |
| 8,879,267 B2* | 11/2014 | Henry | ................. | H04L 12/6418 |
| | | | | 361/715 |
| 8,885,342 B2* | 11/2014 | Skepnek | ............... | H01L 23/367 |
| | | | | 174/548 |
| 9,246,280 B2* | 1/2016 | Neer | ..................... | G02B 6/4246 |
| 10,306,806 B2* | 5/2019 | Hall, III | ............... | G02B 6/4246 |

(Continued)

FOREIGN PATENT DOCUMENTS

JP 2009-92748 4/2009

*Primary Examiner* — Thanh Tam T Le
(74) *Attorney, Agent, or Firm* — Fujitsu Patent Center

(57) ABSTRACT

A connector cage includes a cage including an insertion slot from which a module is inserted into the cage; a heat sink which is arranged on a wall of the cage, the heat sink configured to be positioned at a contact position and a separate position with respect to the inserted module, move between the contact position and the separate position, and slide in an insertion direction in which the module is inserted in the cage; a first spring which causes the heat sink to move to the contact position; a protrusion which is provided on the side wall or the heat sink; a push plate extending from the heat sink, and which is pushed by the inserted module; and a hollow which is provided in the heat sink or the wall, and into which the protrusion moves.

17 Claims, 16 Drawing Sheets

(56) References Cited

U.S. PATENT DOCUMENTS 10,389,397 B2 * 8/2019 Edgren ................ H05K 5/0247
10,575,442 B2 * 2/2020 Bucher ................ H01R 12/722

* cited by examiner

CONNECTOR CAGE AND ELECTRONIC DEVICE INCLUDING A PUSH PLATE

CROSS-REFERENCE TO RELATED APPLICATION

This application is based upon and claims the benefit of priority of the prior Japanese Patent Application No. 2018-158705, filed on Aug. 27, 2018, the entire contents of which are incorporated herein by reference.

FIELD

The embodiment disclosed herein relates to a connector cage.

BACKGROUND

There is an optical transmission module assembly having a structure in which an optical transmission module is inserted between a radiator fin and a board. At the start of the insertion of the optical transmission module, a tapered portion of the radiator fin is pushed up by a protrusion of the optical transmission module. In this optical transmission module assembly, when the insertion of the optical transmission module is completed, the protrusion of the optical transmission module reaches a recessed portion of the radiator fin, and the radiator fin is pushed down by a leaf spring, so that thermal connection between the radiator fin and the optical transmission module is established.

Related techniques are disclosed in, for example, Japanese Laid-open Patent Publication No. 2009-92748.

SUMMARY

According to an aspect of the embodiments, a connector cage includes a cage including an insertion slot from which a module is inserted into the cage; a heat sink which is arranged on a wall of the cage, the heat sink configured to be positioned at a contact position and a separate position with respect to the inserted module, move between the contact position and the separate position, and slide in an insertion direction in which the module is inserted in the cage; a first spring which causes the heat sink to move to the contact position; a protrusion provided on the wall or the heat sink, and which supports the heat sink at the separate position by being in contact with the heat sink or the wall; a push plate extending from the heat sink, and which is pushed by the inserted module to cause the heat sink to slide to a back side of the cage in the insertion direction; and a hollow which is provided in the heat sink or the wall, and into which the protrusion moves as a result of sliding of the heat sink to the back side, so that the protrusion no longer supports the heat sink.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, there is a connector cage into which a module including an electronic circuit is inserted, and which includes a heat sink to be in contact with the module. If the heat sink is in contact with the module in the course of the insertion, the heat sink and the module rub against each other, which hinders the insertion of the module.

A connector cage 32 of a first embodiment is described in detail based on the drawings.

Figure 1:
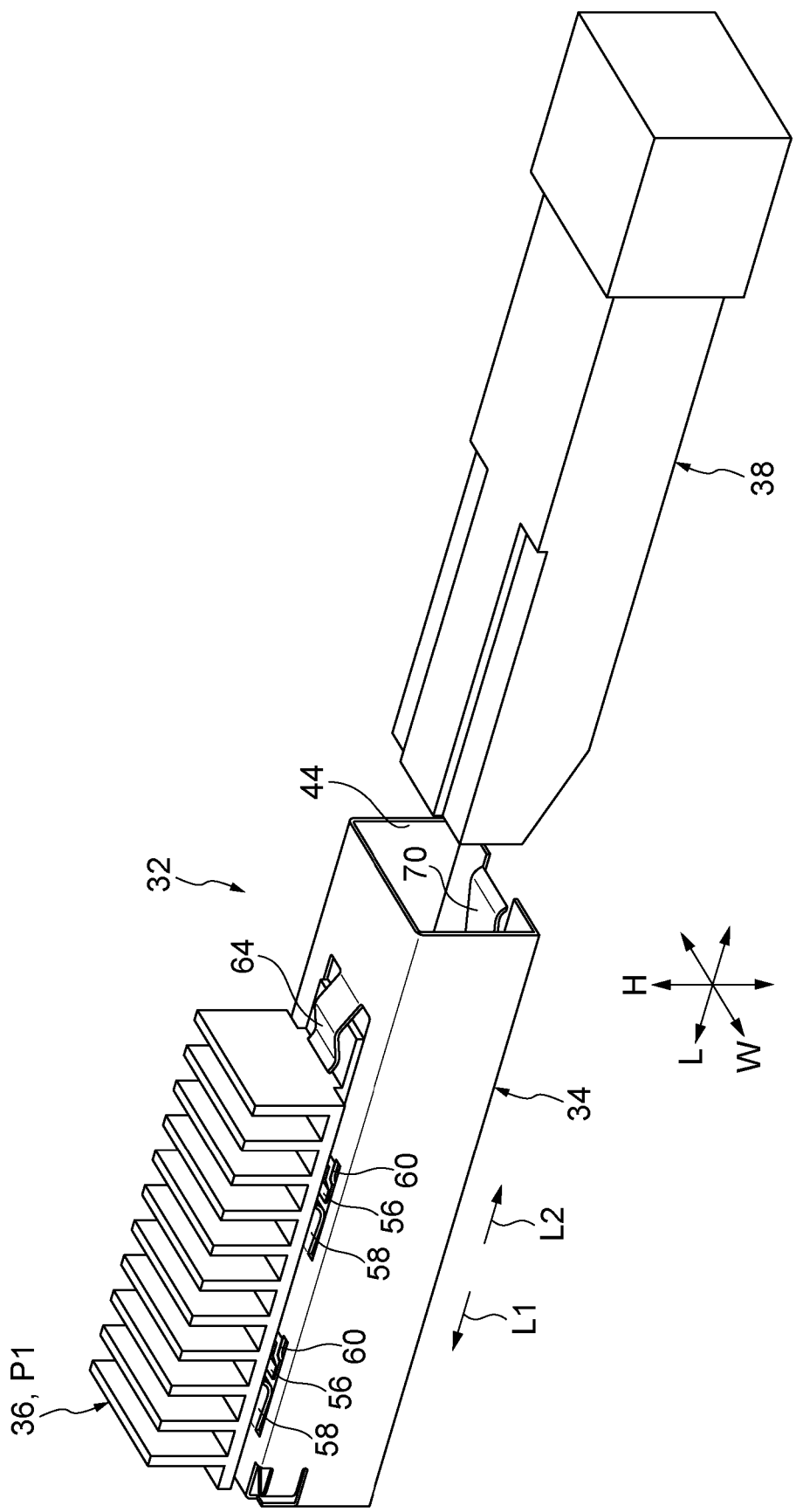
FIG. 1 is a perspective view illustrating a connector cage of a first embodiment together with a module.
Figure 2:
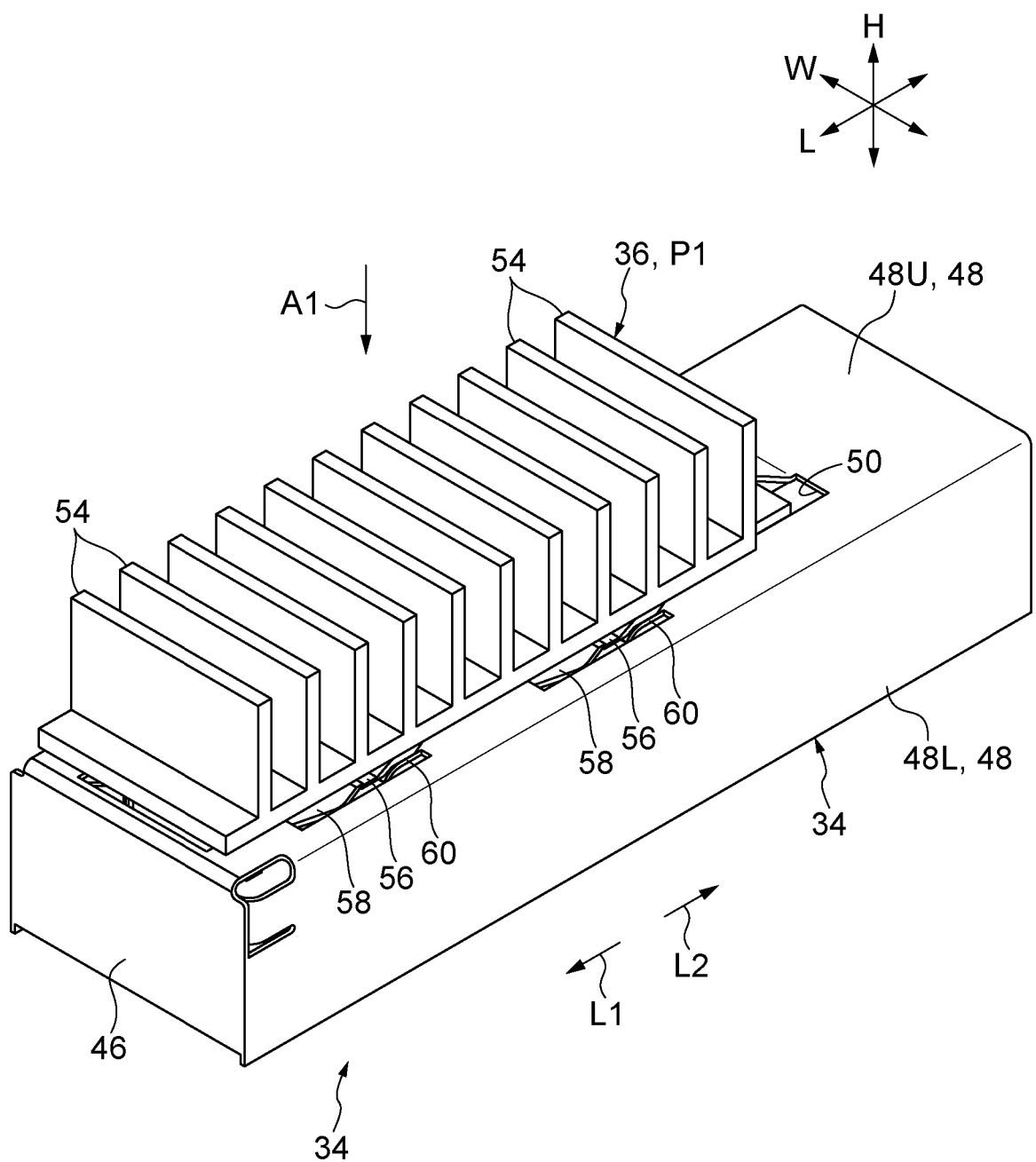
FIG. 2 is a perspective view illustrating the connector cage of the first embodiment.

As illustrated in FIGS. 1 and 2, the connector cage 32 includes a cage main body 34 and a heat sink 36.

In the present embodiment, the cage main body 34 is a member in a cuboid box shape (a right rectangular prism shape), and is opened at one end in a longitudinal direction. This opened end serves as an insertion slot 44 through which a module 38 is inserted as illustrated in FIG. 1.

Hereinafter, the longitudinal direction, a width direction, and a height direction of the cage main body 34 are indicated by arrows L, W, and H, respectively. In particular, a direction toward the back side in the longitudinal direction is indicated by an arrow L1 and a direction toward the front side in the longitudinal direction is indicated by an arrow L2.

Figure 15:
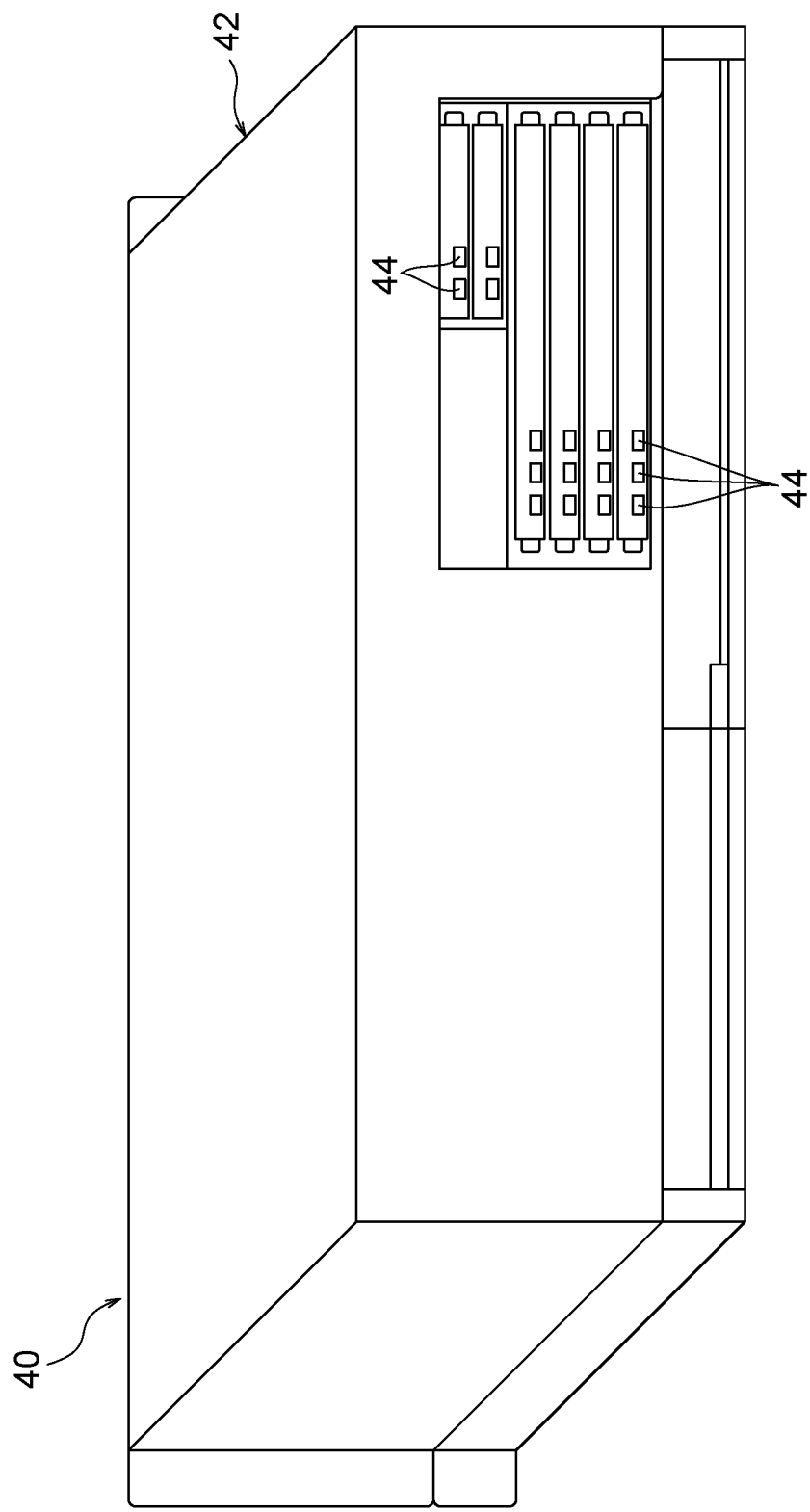
FIG. 15 is a perspective view illustrating an electronic device including the connector cage of the first embodiment.

FIG. 15 illustrates an electronic device 40 including the connector cage 32. The electronic device 40 includes a cabinet 42. A board mounted with electronic circuits, for example, is placed inside the cabinet 42. The connector cage 32 is attached to this board, and the insertion slot 44 is exposed to the outside of the cabinet 42. Thus, the insertion of the module 38 into the insertion slot 44 of the connector cage 32 is possible from the outside of the cabinet 42. When the module 38 is inserted in the connector cage 32, the module 38 is connected to, for example, a connection member mounted on the board, and thereby is enabled to transmit and receive electronic signals and optical signals.

Figure 3:
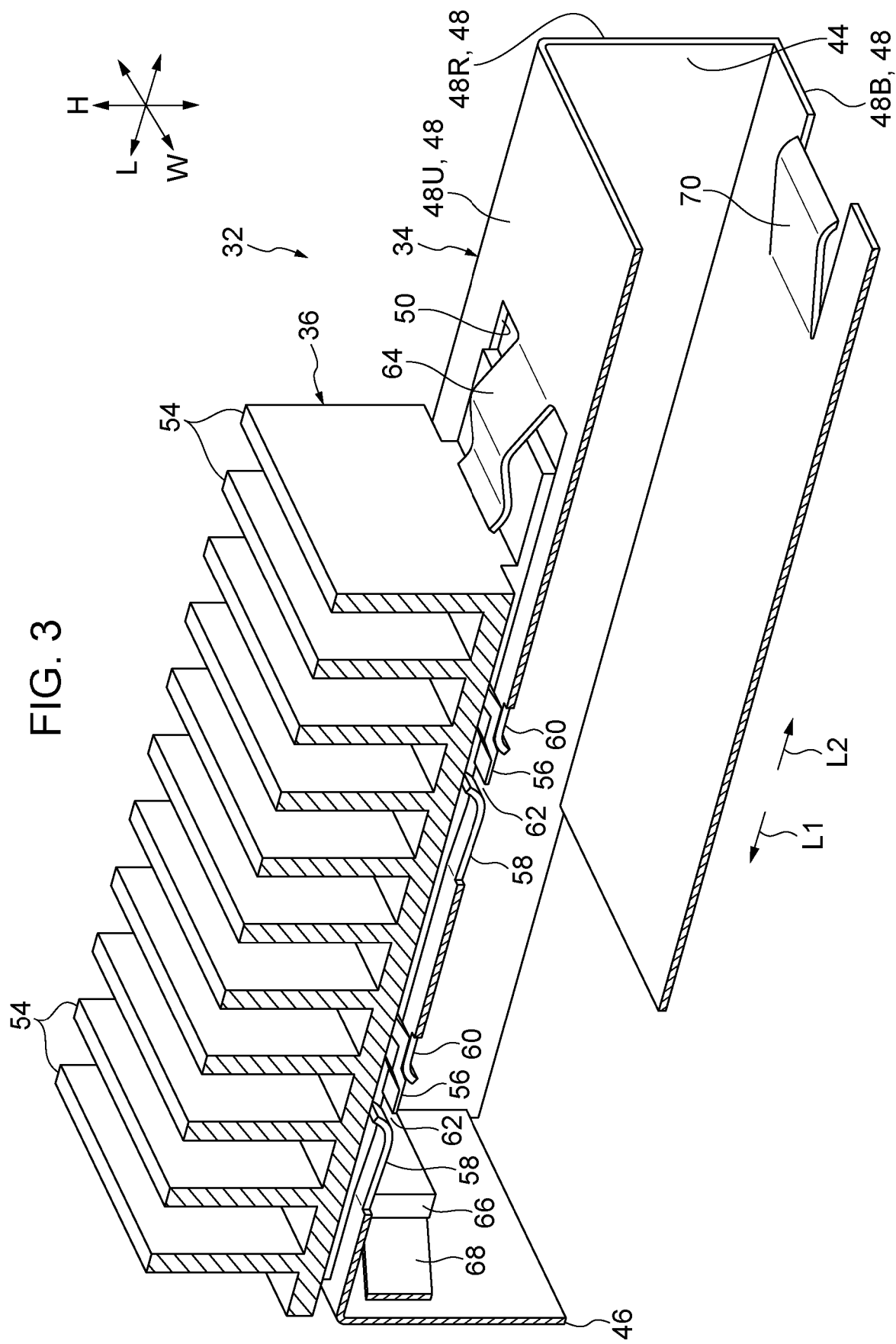
FIG. 3 is a perspective cutaway view illustrating the connector cage of the first embodiment.
Figure 4:
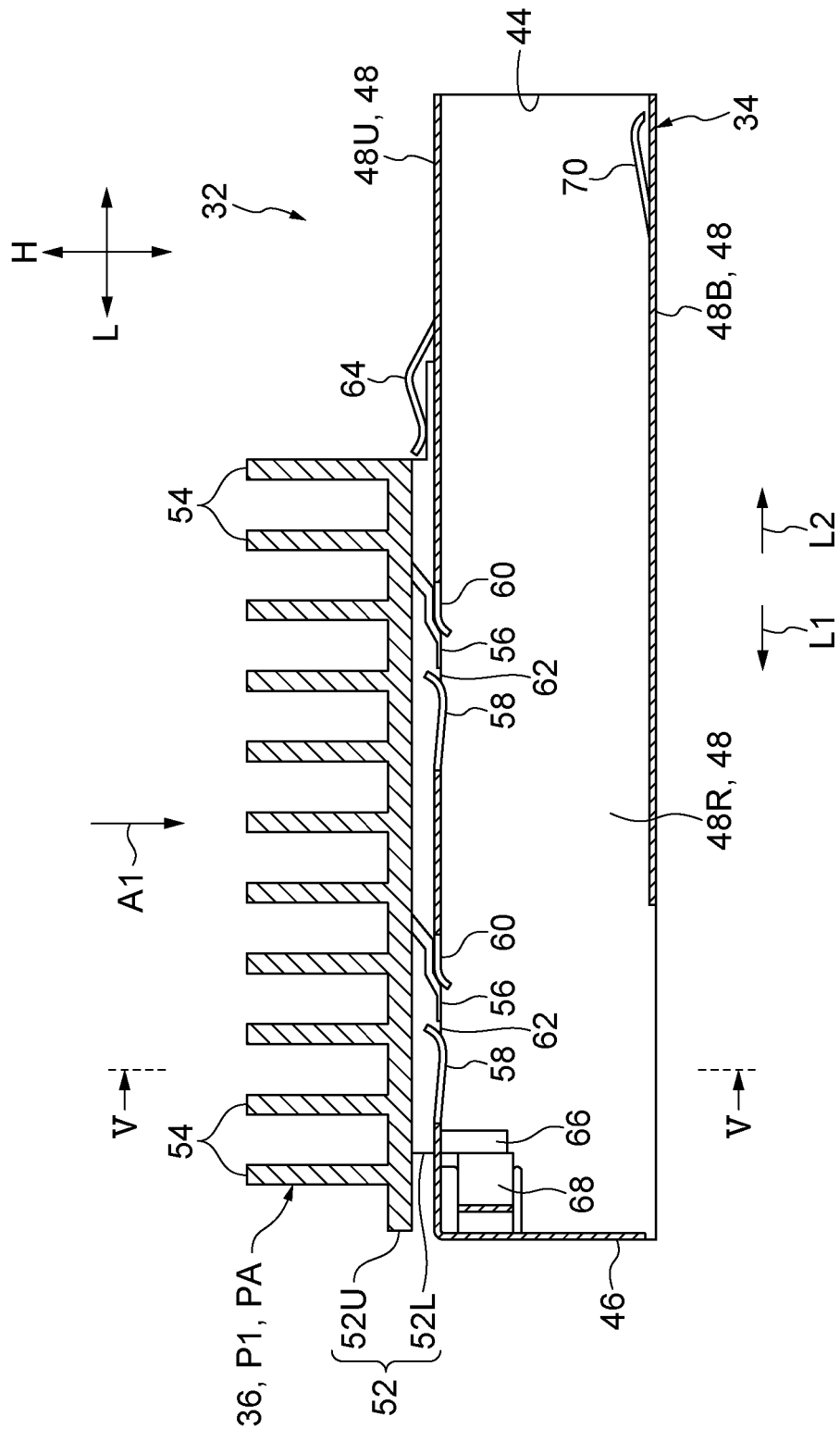
FIG. 4 is a cross sectional view illustrating a cross section of the connector cage of the first embodiment taken along a longitudinal direction.
Figure 5:
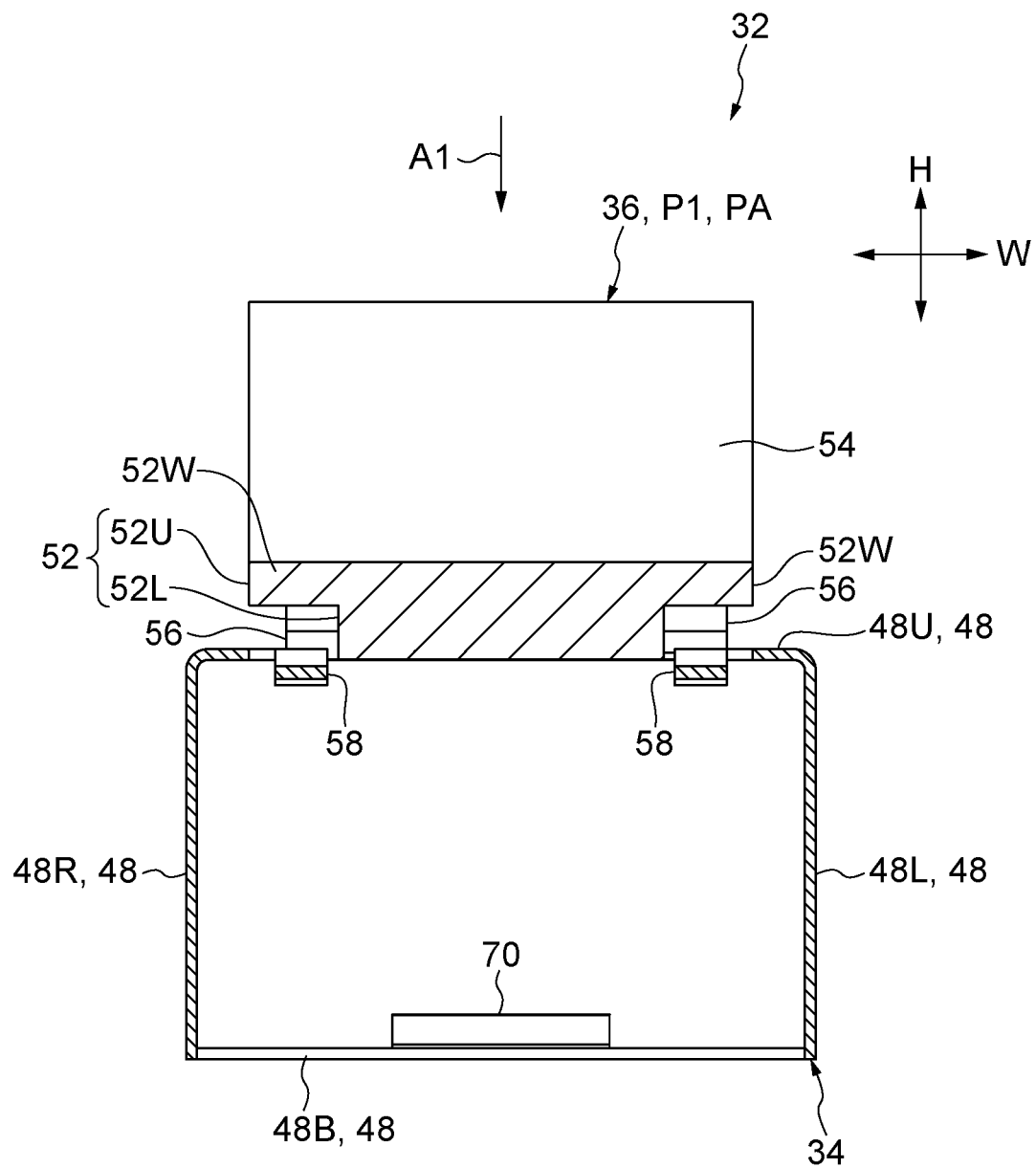
FIG. 5 is a cross sectional view illustrating the connector cage of the first embodiment taken along a V-V line in FIG. 4.

As also illustrated in FIGS. 3 and 4, a back wall 46 is provided on the back side of the cage main body 34 in the present embodiment. As also illustrated in FIG. 5, four side walls 48 (an upper wall 48U, a bottom wall 48B, a right wall 48R, and a left wall 48L) are provided between the back wall 46 and the insertion slot 44. The upper wall 48U is provided with a rectangular attachment hole 50 bored through the upper wall 48U in a thickness direction. The heat sink 36 is placed on the upper wall 48U at a position aligned with the attachment hole 50.

The heat sink 36 in the present embodiment includes a base plate 52 extending in the same direction as the longitudinal direction of the cage main body 34, and multiple fins 54 provided standing on the base plate 52.

In the present embodiment, the base plate 52 has a two-layer structure including a lower layer 52L and an upper layer 52U. Each of the lower layer 52L and the upper layer 52U has a plate-like shape (a flat cuboid shape) which is rectangular when viewed in an arrow μl direction and has a predetermined thickness.

The length of the lower layer 52L of the base plate 52 (the length in the arrow L direction) is shorter than the length of the attachment hole 50. The lower layer 52L is located inside the attachment hole 50, and a gap between the heat sink 36 and the attachment hole 50 is formed on at least either one of the back wall 46 side and the insertion slot 44 side. This gap allows the heat sink 36 to slide in the arrow L1 direction and the arrow L2 direction between a first position P1 (see FIG. 4) at which the heat sink 36 is moved to the insertion slot 44 side and a second position P2 (see FIG. 13) at which the heat sink 36 is moved to the back wall 46 side.

The width of the upper layer 52U of the base plate 52 (the length in the arrow W direction) is wider than the width of the attachment hole 50. Thus, the upper layer 52U includes extended portions 52W protruding outward from both sides of the attachment hole 50 in the width direction. As is seen from FIG. 5, lower surfaces of the extended portions 52W face an upper surface of the upper wall 48U. This structure keeps the entire heat sink 36 from falling into the cage main body 34.

As illustrated in FIGS. 4 and 5, the lower surface of each extended portion 52W is provided with claw pieces 56. In the present embodiment, four claw pieces 56 in total are provided: two claw pieces 56 are arranged in the width direction (see FIG. 5); and two claw pieces 56 are arranged in the longitudinal direction (see FIG. 4).

Figure 6:
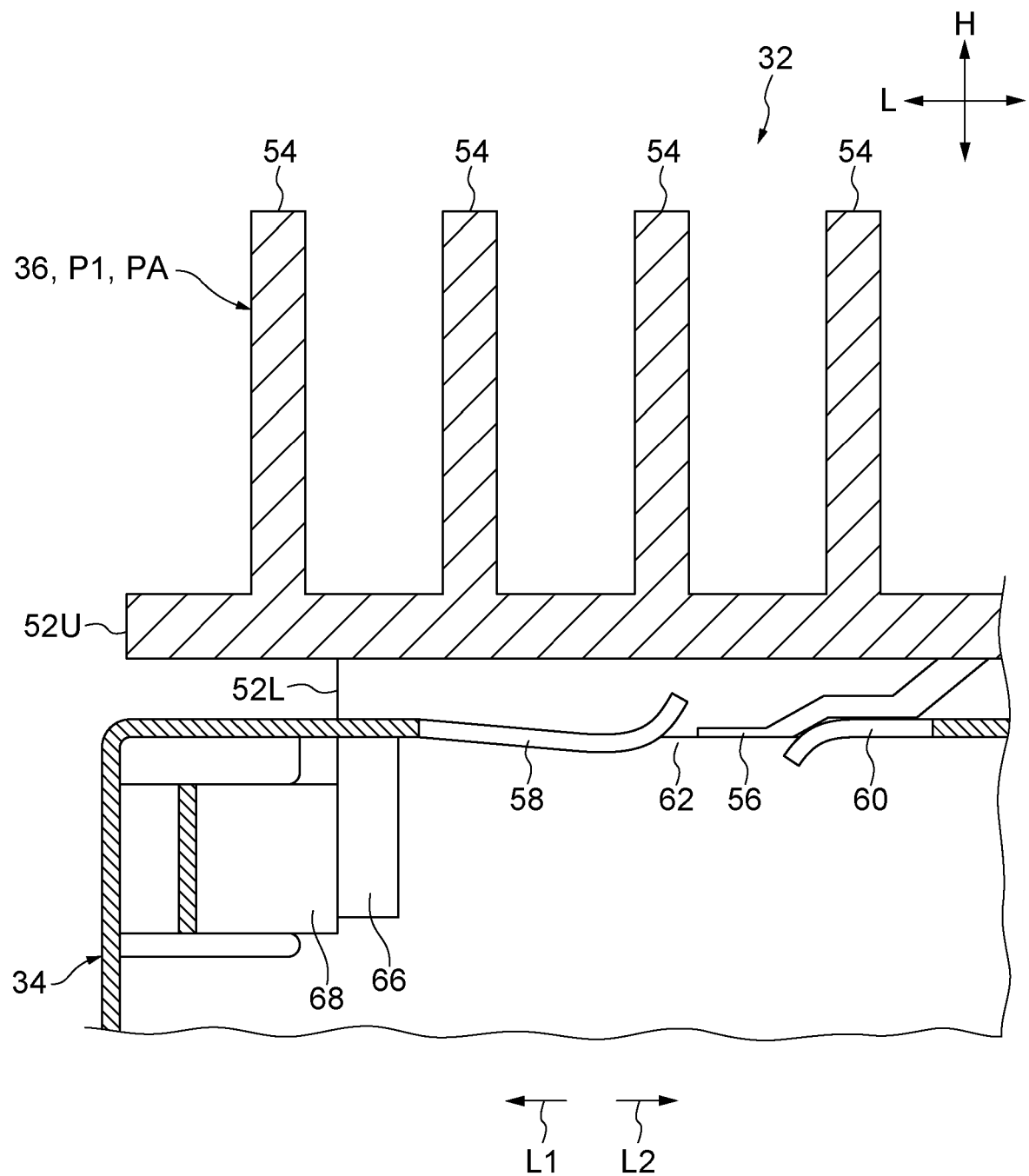
FIG. 6 is an enlarged cross sectional view illustrating a part of the connector cage of the first embodiment.
Figure 7:
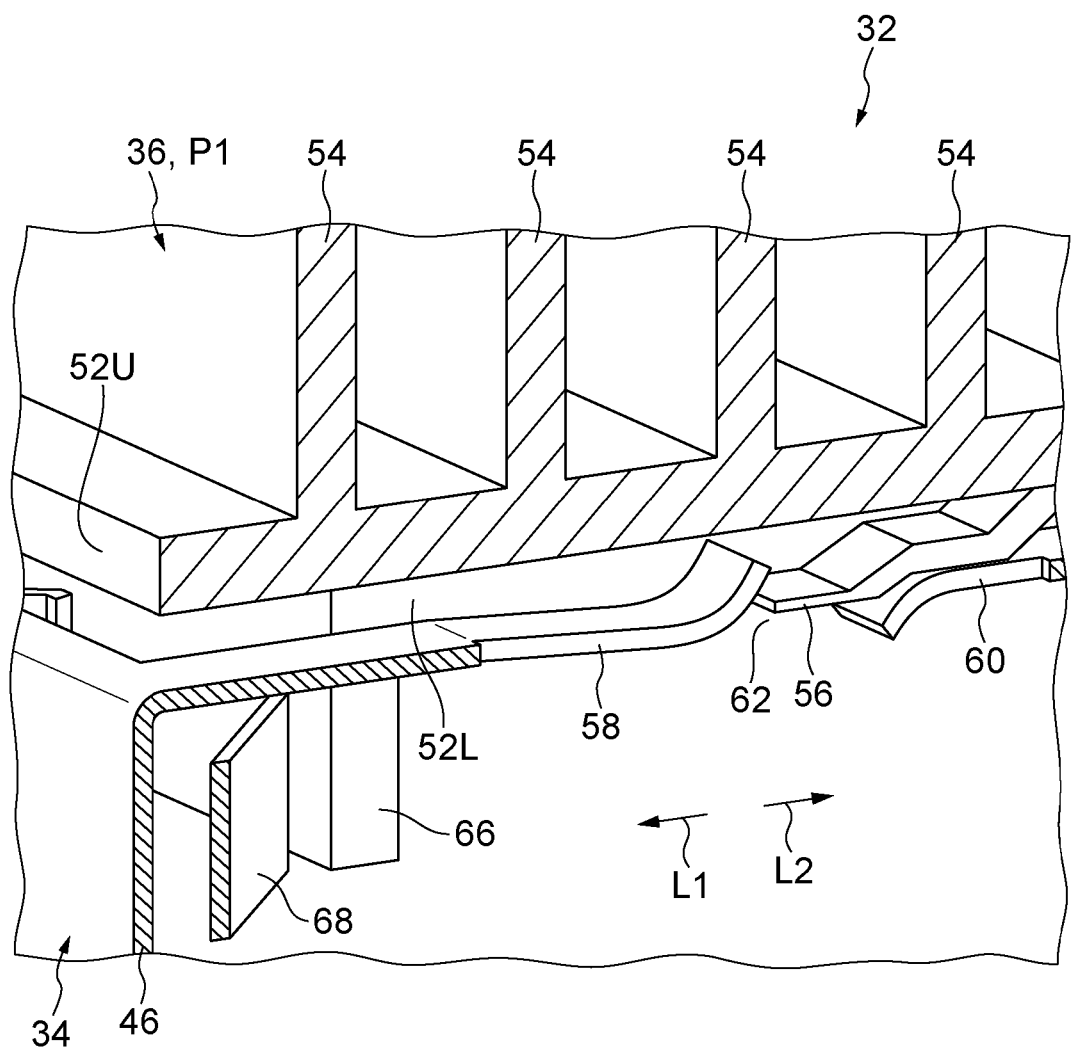
FIG. 7 is an enlarged cutaway cross sectional view of the connector cage of the first embodiment.

As also illustrated in details in FIGS. 6 and 7, each claw piece 56 is a plate-shaped portion extended in the arrow L1 direction (the direction from the insertion slot 44 side to the back wall 46 side) and inclined to get close to the upper wall 48U. In the present embodiment, the claw piece 56 is bent at obtuse angles at several points (two points in the example illustrated in the drawings).

As illustrated in FIGS. 4 and 6, the claw pieces 56 are in contact with the upper surface of the upper wall 48U when the heat sink 36 is located at the first position P1. In other words, the heat sink 36 is supported by the claw pieces 56 on the upper surface of the upper wall 48U, and a gap GP is formed between the heat sink 36 and the module 38 inserted in the cage main body 34. Thus, the heat sink 36 is held at a separate position PA at which the lower layer 52L is out of contact with the module 38.

The upper wall 48U is provided with a first leaf spring 58, a second leaf spring 60, and a bored portion 62 at a position corresponding to each claw piece 56. The first leaf spring 58 is located closer to the back wall 46 than the corresponding second leaf spring 60 is.

The first leaf spring 58 is extended from the back wall 46 side to the insertion slot 44 side, and the second leaf spring 60 is extended from the insertion slot 44 side to the back wall 46 side. The bored portion 62 is provided as a gap between the tip end of the first leaf spring 58 and the tip end of the second leaf spring 60. In the present embodiment, the bored portion 62 is bored through the upper wall 48U.

Figure 10:
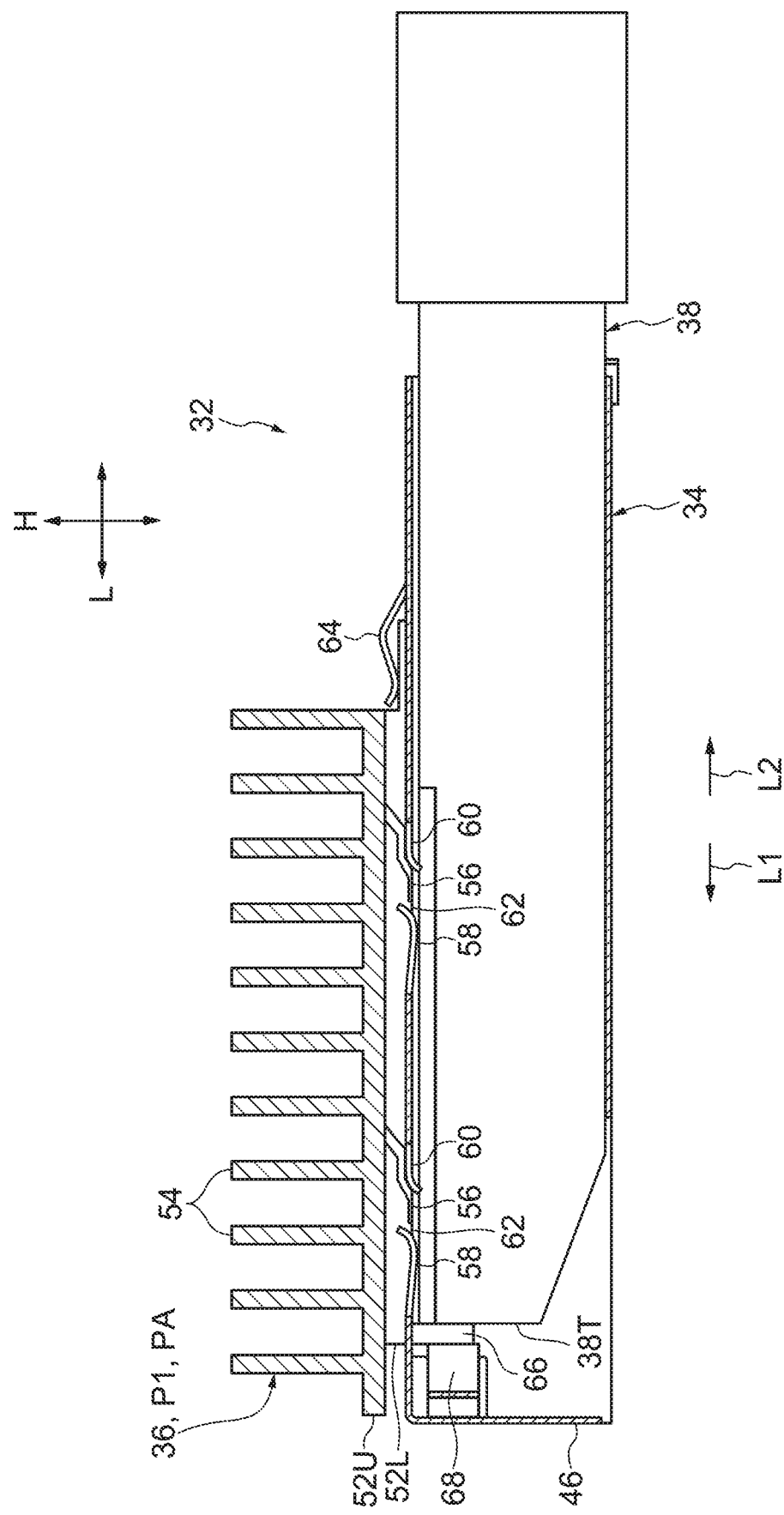
FIG. 10 is a cross sectional view illustrating a cross section of the connector cage of the first embodiment taken along the longitudinal direction together with a part of the module.
Figure 11:
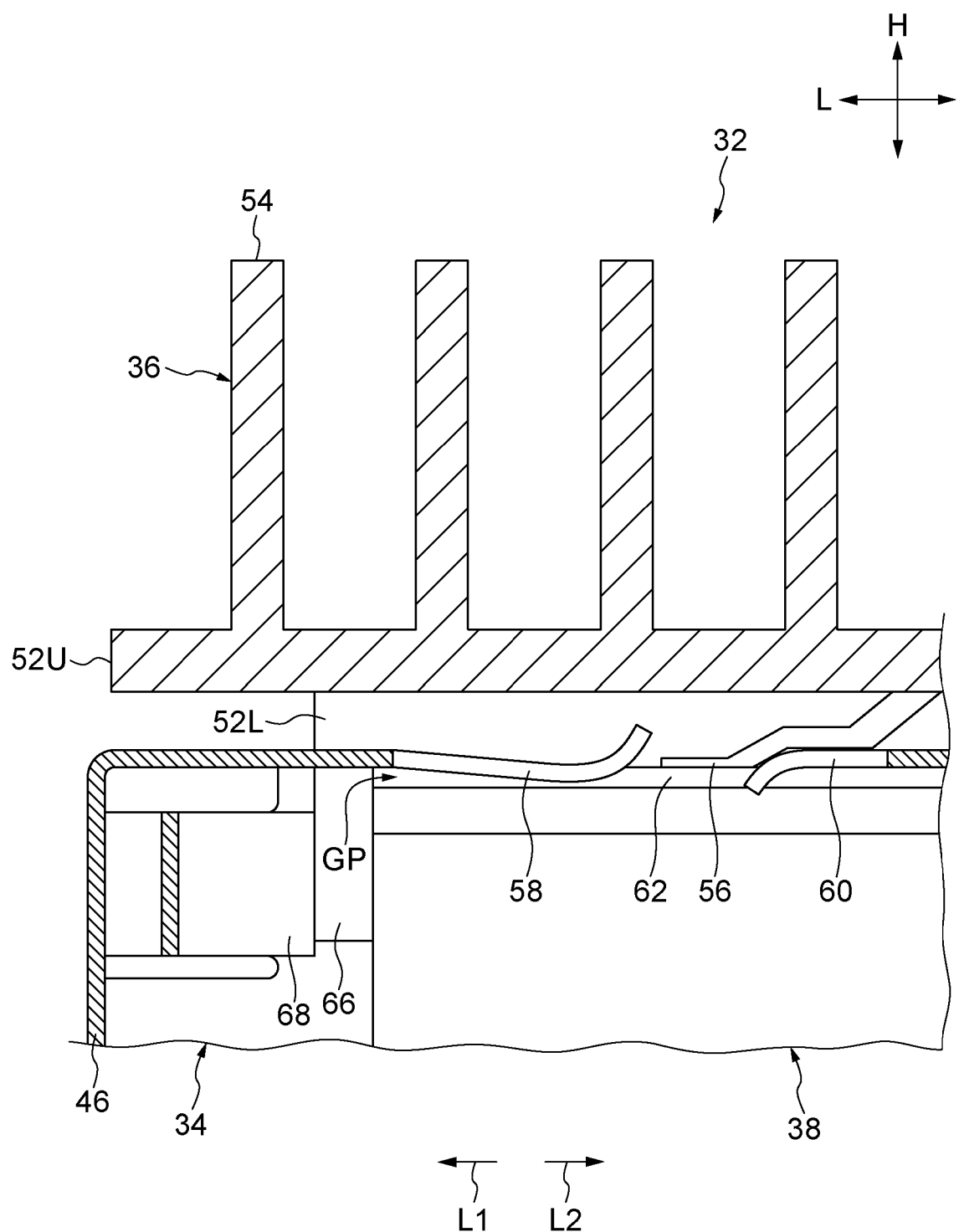
FIG. 11 is an enlarged cross sectional view illustrating a part of the connector cage of the first embodiment together with a part of the module.

When the heat sink 36 slides from the first position P1 to the second position P2, the tip end portions of the claw pieces 56 fall into the bored portions 62 in the course of the above sliding (in the final stage of the sliding in the present embodiment) as illustrated in FIGS. 10 and 11. When the tip end portions of the claw pieces 56 are located in the bored portions 62, the heat sink 36 is not supported any more by the claw pieces 56 on the upper surface of the upper wall 48U, but is allowed to move to the inner side of the cage main body 34 (move to a contact position PB to be described later).

Figure 13:
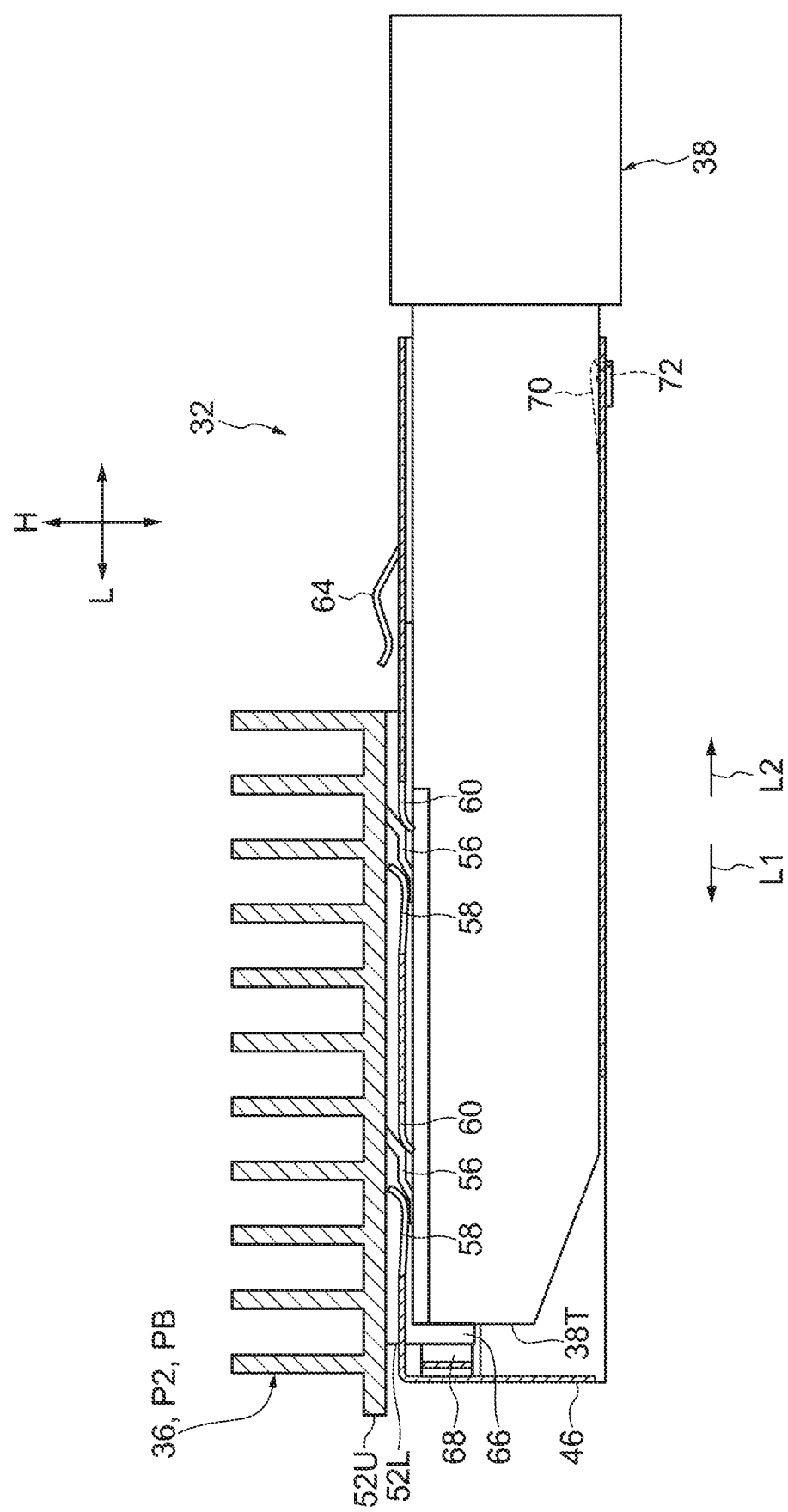
FIG. 13 is a cross sectional view illustrating a cross section of the connector cage of the first embodiment taken along the longitudinal direction together with a part of the module.
Figure 14:
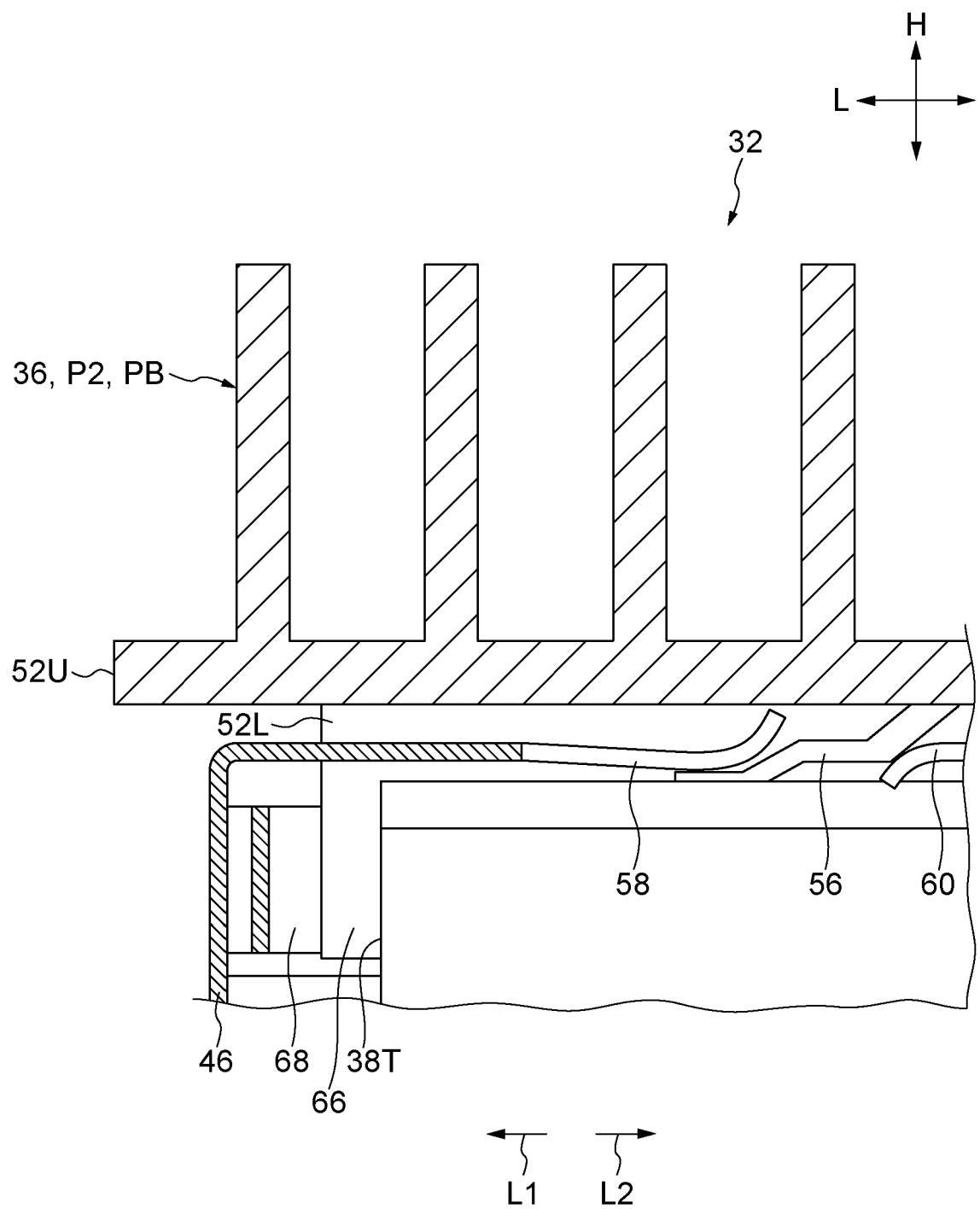
FIG. 14 is an enlarged cross sectional view illustrating a part of the connector cage of the first embodiment together with a part of the module.

The first leaf spring 58 is inclined to the inner side of the cage main body 34 (downward) while extending from the back wall 46 side to the insertion slot 44 side (in the arrow L2 direction), and then is curved upward at its tip end side (the insertion slot 44 side). As illustrated in FIGS. 13 and 14, when the tip end portion of the claw piece 56 comes into contact with the lower surface of the first leaf spring 58, the first leaf spring 58 exerts a downward spring force on the heat sink 36 via the claw piece 56. A position to which the heat sink 36 is moved downward by receiving the spring force of the first leaf spring 58 is the contact position PB at which the heat sink 36 is in contact with the module 38 inserted in the cage main body 34.

Figure 12:
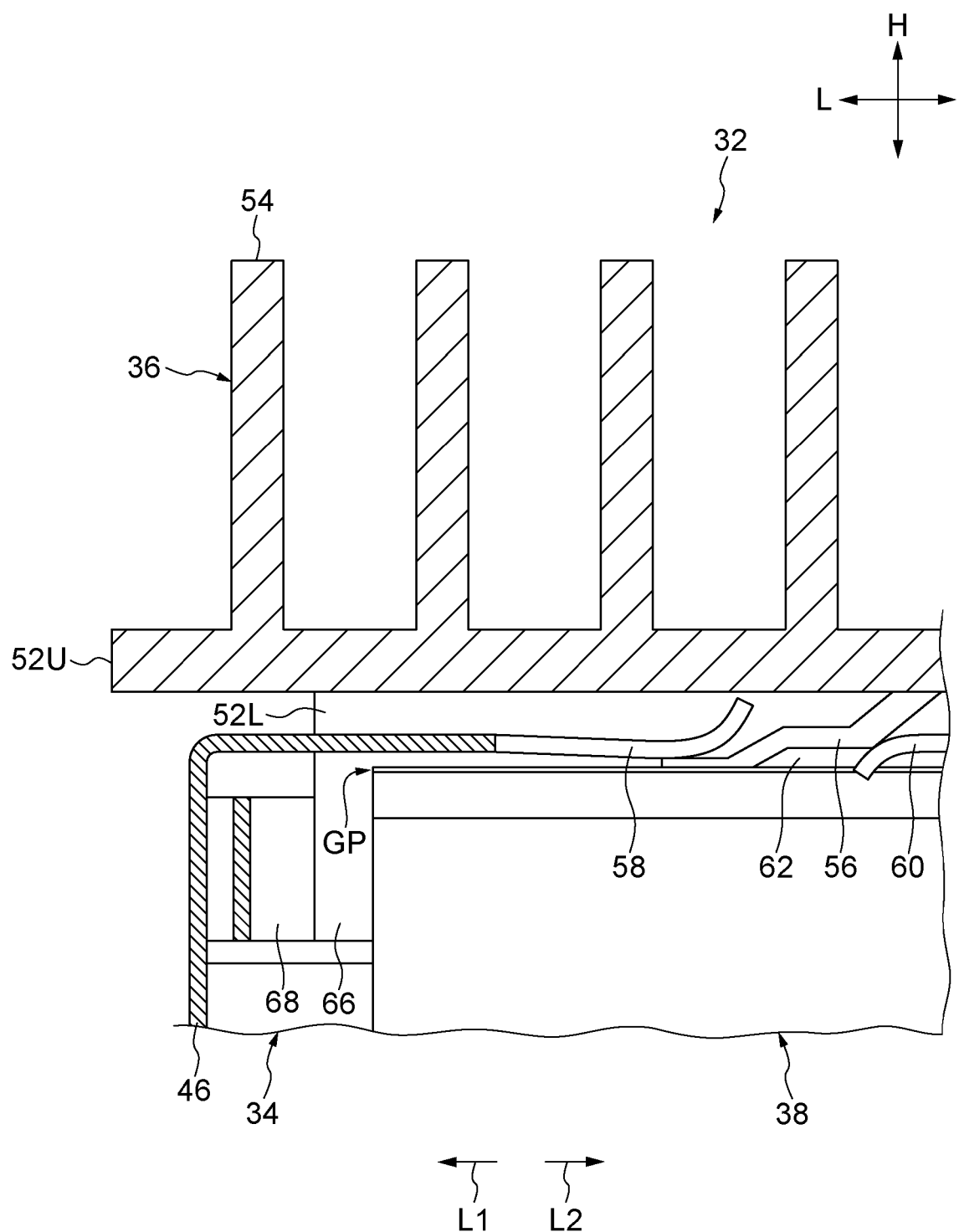
FIG. 12 is an enlarged cross sectional view illustrating a part of the connector cage of the first embodiment together with a part of the module.

The second leaf spring 60 is extended from the insertion slot 44 side to the back wall 46 side (in the arrow L1 direction), and then is curved downward at its tip end side (the back wall 46 side). The second leaf spring 60 has the tip end side inclined downward as described above, and is one example of an inclined plate. As illustrated in FIG. 12, the tip end portion of the claw piece 56 comes into contact with the upper surface of the second leaf spring 60 in the course of the sliding of the heat sink 36 from the first position P1 to the second position P2. In other words, the upper surface of the second leaf spring 60 serves as a surface for smoothly guiding the claw piece 56 into the bored portion 62. In this process, the second leaf spring 60 bows downward, and exerts an upward spring force on the claw piece 56.

In the present embodiment, both of the first leaf spring 58 and the second leaf spring 60 are formed in such a way that a plate material constituting the upper wall 48U (the cage main body 34) is cut out partly in a predetermined shape and uncut portions of the plate material are shaped as designed. Here, the lengths of the first leaf spring 58 and the second leaf spring 60 are set such that the gap between the tip end of the first leaf spring 58 and the tip end of the second leaf spring 60 may serve as the bored portion 62.

The fins 54 of the heat sink 36 are plate-shaped members having the same width and the same height in the present embodiment. Then, the fins 54 are arranged to stand on the base plate 52 at regular intervals in the longitudinal direction.

As illustrated in FIGS. 3 and 4, the upper wall 48U of the cage main body 34 is provided with a holddown spring 64. The holddown spring 64 in contact with the base plate 52 of the heat sink 36 from above exerts a downward spring force on the base plate 52 to inhibit the heat sink 36 from moving upward.

A push plate 66 is extended downward from the base plate 52 (the lower layer 52L in the present embodiment) of the heat sink 36. As illustrated in FIGS. 10 and 11, the push plate 66 is a portion with which a tip end 38T of the module 38 comes into contact in the final stage of the insertion of the module 38 into the cage main body 34.

An ejection spring 68 is arranged between the back wall 46 of the cage main body 34 and the push plate 66. The ejection spring 68 exerts a spring force in a direction toward the first position P1 (the arrow L2 direction) on the heat sink 36 via the push plate 66.

When the tip end 38T of the module 38 inserted in the cage main body 34 is further moved toward the back wall 46 while being in contact with the push plate 66, the heat sink 36 is pushed by the module 38 via the push plate 66. Then, the heat sink 36 slides toward the back wall 46, that is, the second position P2 against the spring force of the ejection spring 68. The spring force of the ejection spring 68 acts on the module 38 via the push plate 66 as a force in the arrow L2 direction, in other words, a force to eject the module 38 from the cage main body 34.

A lock spring 70 is formed at a position on the insertion slot 44 side in the bottom wall 48B of the cage main body 34. Correspondingly, a lock hole 72 is formed in the module 38. As illustrated in FIG. 13, the lock spring 70 is locked up in the lock hole 72 in the module 38 when the module 38 inserted in the cage main body 34 reaches the second position P2. This locking inhibits the module 38 from moving in the arrow L2 direction even though the spring force of the ejection spring 68 acts on the module 38 via the push plate 66. When the lock spring 70 is bent, the locking of the lock spring 70 in the lock hole 72 is released. In one possible case, for example, an unlock mechanism to release the locking of the lock spring 70 in the lock hole 72 is provided to the module 38, and the locking is released by operating this unlock mechanism.

Next, description is provided for effects of the embodiment discussed herein.

As illustrated in FIGS. 4, 6, and 7, when the module 38 is not inserted in the cage main body 34, the spring force of the ejection spring 68 acts in the arrow L1 direction on the heat sink 36 via the push plate 66. Thus, the heat sink 36 is held at the first position P1.

In this state, the tip end portion of each claw piece 56 does not reach the lower side of the first leaf spring 58, and the spring force of the first leaf spring 58 does not act on the claw piece 56. Thus, the heat sink 36 is not pushed downward toward the contact position PB.

In addition, the claw pieces 56 are in contact with the upper surface of the upper wall 48U, and support the heat sink 36 at the separate position PA. Thus, the heat sink 36 is held at the separate position PA.

Figure 8:
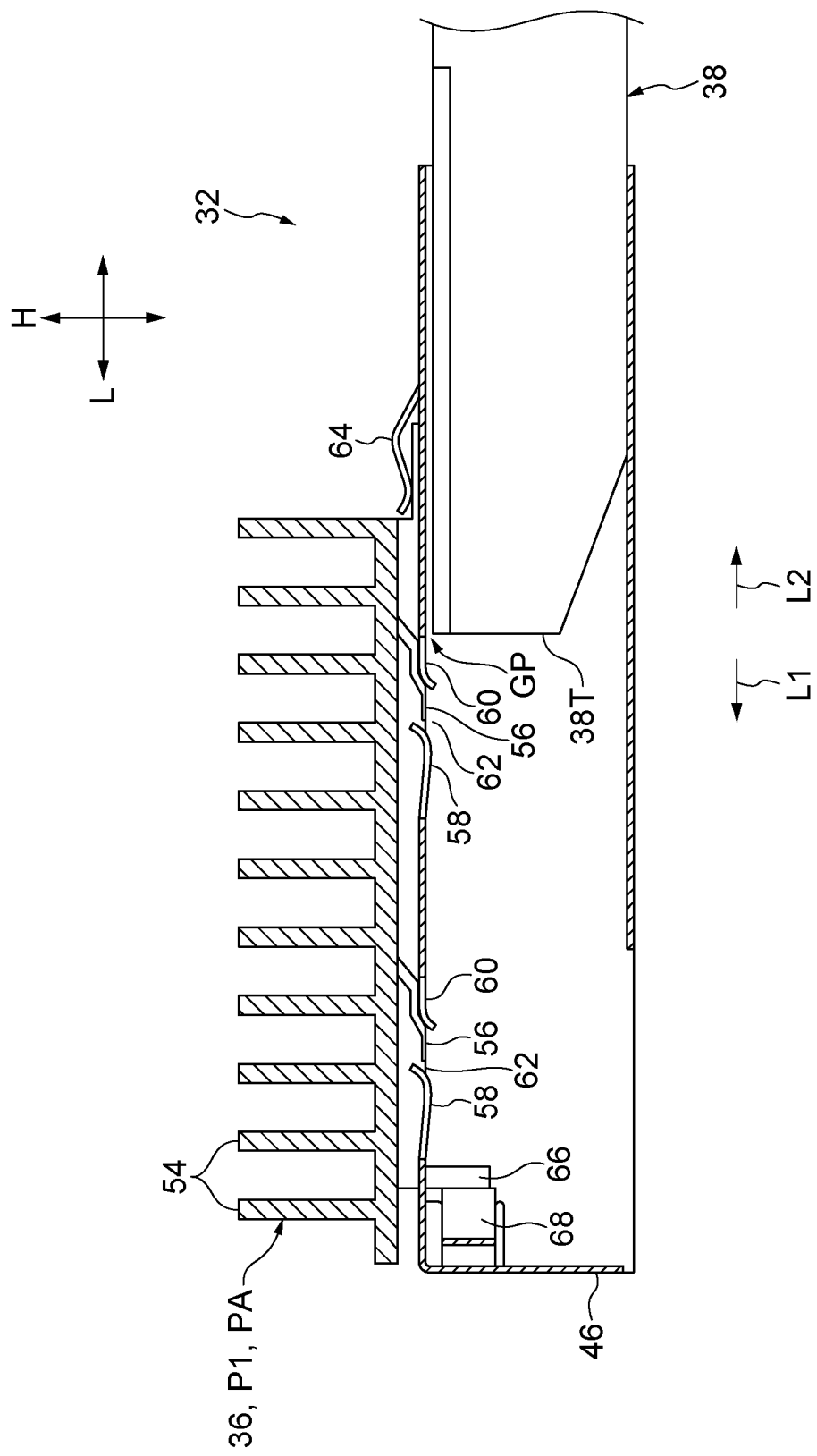
FIG. 8 is a cross sectional view illustrating a cross section of the connector cage of the first embodiment taken along the longitudinal direction together with a part of the module.
Figure 9:
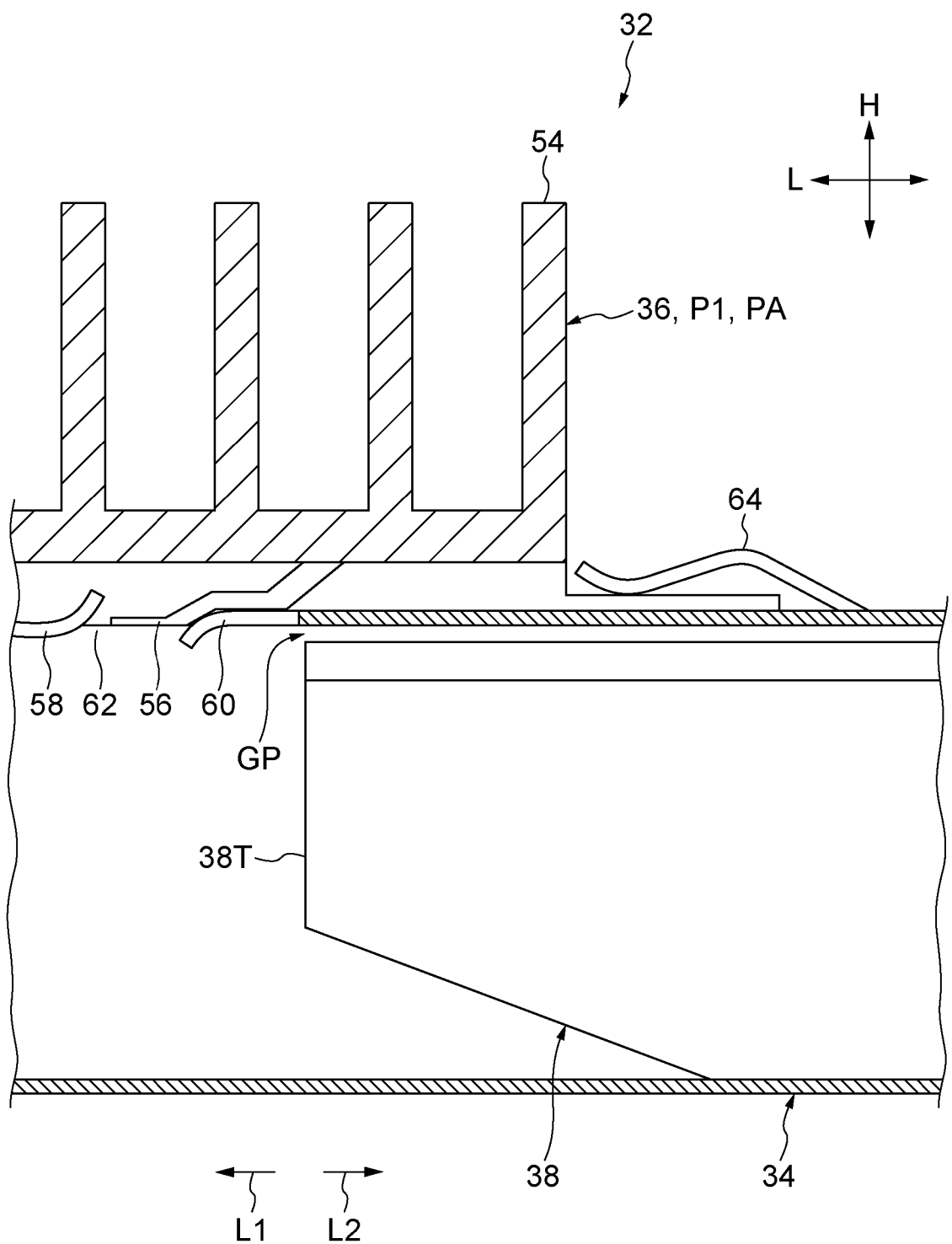
FIG. 9 is an enlarged cross sectional view illustrating a part of the connector cage of the first embodiment together with a part of the module.

As illustrated in FIGS. 8 and 9, when the module 38 is inserted from the insertion slot 44, the module 38 in the course of the insertion is kept out of contact with the heat sink 36 because the heat sink 36 is held at the separate position PA. In other words, in the course of the insertion of the module 38, the gap GP is formed between the module 38 and the heat sink 36 to inhibit the module 38 from rubbing against the heat sink 36. This structure requires only a smaller force for the insertion and enables smoother insertion than a structure in which the module 38 and the heat sink 36 rub against each other. In addition, there is no risk that the rubbing of the module 38 and the heat sink 36 generates cut particles and chips.

As illustrated in FIGS. 10 and 11, in the final stage of the insertion of the module 38, the tip end 38T of the module 38 comes into contact with the push plate 66. In the insertion of the module 38, the spring force of the ejection spring 68 acts on the module 38 via the push plate 66. However, the present structure allows the module 38 to be inserted further to the back wall 46 side against the above spring force. The heat sink 36 is pushed by the module 38 via the push plate 66 to slide from the first position P1 to the second position P2.

In this sliding, the claw pieces 56 slide on the upper surfaces of the second leaf springs 60 and are guided into the bored portions 62. As illustrated in FIG. 11, when the tip end portions of the claw pieces 56 fall into the bored portions 62, the heat sink 36 is not supported any more at the separate position PA by the claw pieces 56.

As illustrated in FIG. 12, when the tip end portion of the claw piece 56 comes into contact with the lower surface of the first leaf spring 58, the spring force of the first leaf spring 58 acts on the heat sink 36 via the claw piece 56. Thus, the heat sink 36 is pushed to the contact position PB. Then, as illustrated in FIGS. 13 and 14, the lower surface of the heat sink 36 comes into close contact with the module 38. The close contact of the heat sink 36 with the module 38 enables efficient transfer of the heat of the module 38 to the heat sink 36, thereby cooling the module 38.

When the module 38 is inserted in the cage main body 34 and is connected to the connection member mounted on the board, the module 38 is ready to receive and transmit electronic signals and optical signals. In this state, the lock spring 70 of the cage main body 34 is locked up in the lock hole 72 of the module 38. Thus, the module 38 does not move in the arrow L2 direction even though the spring force of the ejection spring 68 acts on the module 38 via the push plate 66. This ensures stable connection of the module 38 to the connection member mounted on the board.

In order to eject the module 38 from the cage main body 34, the locking of the lock spring 70 in the lock hole 72 is released by operating the unlock mechanism provided to the module 38. The module 38 is enabled to move in the arrow L2 direction, and thus be pulled out from the cage main body 34.

In this process, the spring force of the ejection spring 68 acts on the heat sink 36 via the push plate 66. Thus, the heat sink 36 is allowed to slide from the second position P2 to the first position P1.

While the heat sink 36 is sliding from the second position P2 toward the first position P1, the tip end portions of the claw pieces 56 take off from the lower surfaces of the first leaf springs 58. In other words, the heat sink 36 is not pushed any more to the contact position PB by the first leaf springs 58. When the heat sink 36 further slides toward the first position P1, the claw pieces 56 run on the upper surface of the upper wall 48U, and the heat sink 36 is supported at the separate position PA by the claw pieces 56. Thus, the heat sink 36 reaches the first position P1.

While the heat sink 36 is sliding from the second position P2 toward the first position P1, the spring force of the ejection spring 68 also acts on the module 38 via the push plate 66, because the tip end 38T of the module 38 is in contact with the push plate 66. This structure requires only a smaller force to pull out the module 38 than a structure in which the spring force of the ejection spring 68 does not act.

Incidentally, although the ejection spring 68 is in contact with the push plate 66 and pushes the heat sink 36 from the second position P2 to the first position P1 in the above example, the ejection spring 68 may be in contact with a portion other than the push plate 66 and push the heat sink 36.

In addition, the ejection spring may be a coil spring instead of a leaf spring. As described above, the structure in which the ejection spring 68 being the leaf spring is in contact with the push plate 66 ensures a wide contact area and enables the ejection spring 68 to stably push the heat sink 36.

In addition, the ejection spring 68 is arranged between the back wall 46 of the cage main body 34 and the push plate 66 of the heat sink 36. In other words, the space between the back wall 46 and the push plate 66 is effectively used to arrange the ejection spring 68.

The push plate 66 is arranged on the back side of the heat sink 36, in other words, at a position close to the back wall 46 of the cage main body 34. Thus, the module 38 inserted in the cage main body 34 pushes the heat sink 36 from the first position P1 to the second position P2 in the final stage of the insertion. In the middle stage of the insertion of the module 38, the heat sink 36 is kept from sliding to the second position P2 and moving to the contact position PB. This reliably stops the module 38 from rubbing against the heat sink 36 in the course of the insertion. Then, in the final stage of the insertion, the heat sink 36 slides from the first position P1 to the second position P2. Thus, the present structure achieves the state in which the heat sink 36 is pushed to the contact position PB by the spring force of the first leaf spring 58.

In the above-described embodiment, the claw pieces 56 are in contact with the upper wall 48U of the cage main body 34 when the heat sink 36 is located at the first position P1. In this state, the claw pieces 56 support and hold the heat sink 36 at the separate position PA consistently.

In contrast to the above state, when the heat sink 36 slides from the first position P1 to the second position P2, the claw pieces 56 fall into the bored portions 62. This establishes the structure in which the claw pieces 56 do not support the heat sink 36, in other words, the structure in which the heat sink 36 is allowed to move to the contact position PB by receiving the spring force of the first leaf springs 58.

The claw piece 56 is one example of a protrusion, and is a member that supports the heat sink 36 at the first position P1 and holds the heat sink 36 at the separate position PA. The protrusion producing such an effect is not limited to the claw piece 56. For example, the protrusion may be a simple protrusion extending downward from the lower surface of the upper layer 52U. The claw piece 56 in the present embodiment is a plate-shaped member inclined downward while extending from the insertion slot 44 side toward the back wall 46 side. This structure allows the upper surface of the claw piece 56 to come into contact with the first leaf spring 58 when the claw piece 56 is partly located in the bored portion 62. In other words, the claw piece 56 formed as the protrusion is enabled to also function as a member that receives the spring force of the first leaf spring 58. This achieves a simpler structure than a structure provided with not only protrusions that support the heat sink 36 at the first position P1 but also members that receive the spring force of the first leaf springs 58 in addition to the protrusions.

The first leaf spring 58 causes the heat sink 36 to move to the contact position PB, and is one example of a first spring. The first spring is not limited to the first leaf spring 58, but may be, for example, a coil spring. When the first leaf spring 58 is used as the first spring, the first leaf spring 58 is in contact with the upper surface of the claw piece 56 while achieving a wide contact area, and accordingly is enabled to stably exert the spring force on the heat sink 36.

The bored portion 62 is one example of a hollow, and is bored through the upper wall 48U of the cage main body 34 in the present embodiment. In order to establish a state in which the heat sink 36 at the second position P2 are not supported by the claw pieces 56, the hollows may be, for example, simple recesses not bored through the upper wall 48U. Specifically, as long as the recess has a sufficient depth, the recess allows the heat sink 36 to move to the contact position PB while the claw piece 56 is located in the recess. On the other hand, in the case where the hollow is bored through the upper wall 48U like the bored portion 62 in the above-described embodiment, the tip end portion of the claw piece 56 is allowed to get into the inner side of the cage main body 34 (under the upper wall 48U in FIG. 14) while the heat sink 36 is located at the second position P2. Thus, established is the structure in which the claw pieces 56 receive the spring force of the first leaf springs 58 while the tip end portions of the claw pieces 56 are in contact with the lower surfaces of the first leaf springs 58.

Figure 16:
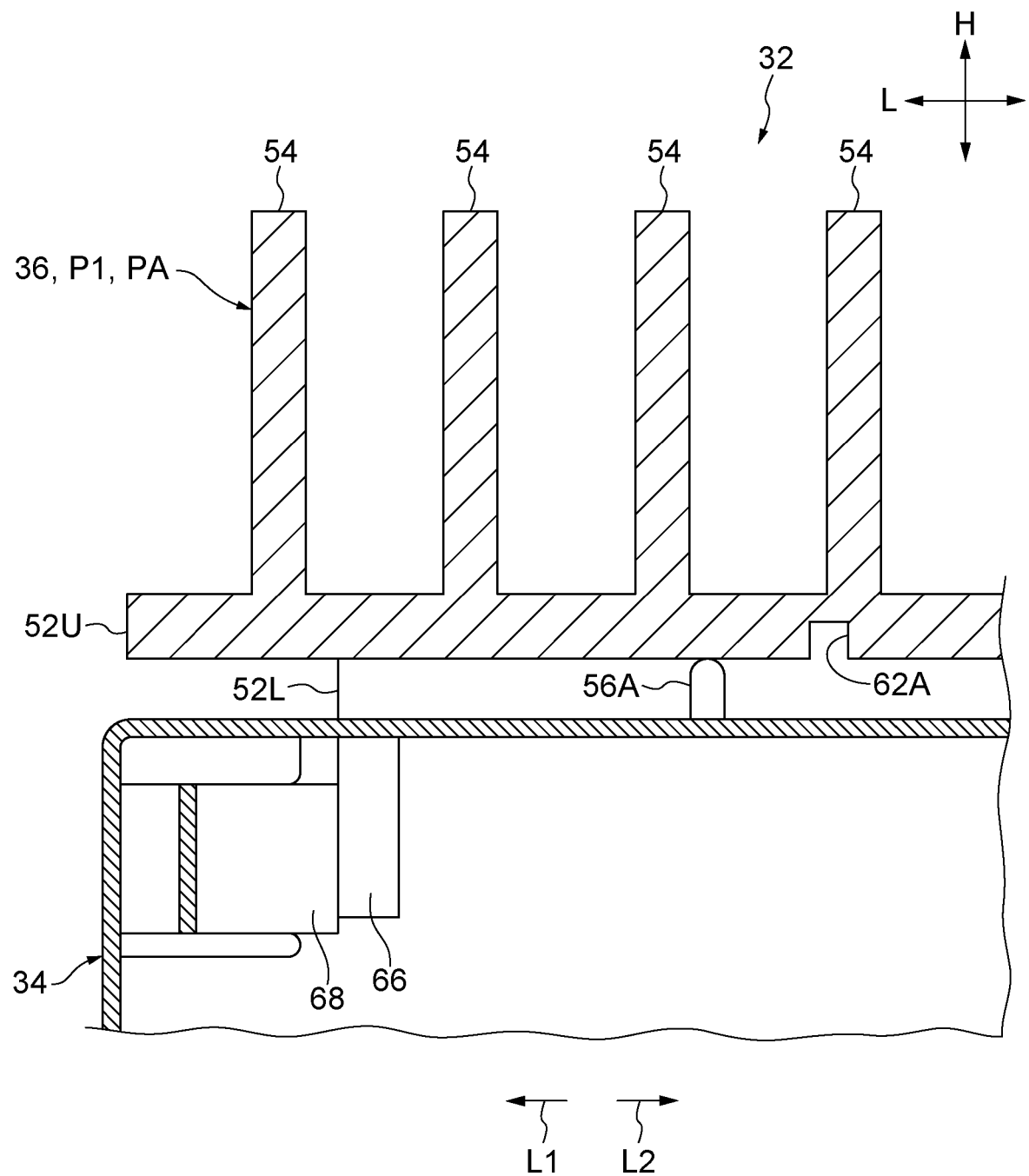
FIG. 16 is an enlarged cross sectional view illustrating a part of a connector cage in a modification of the first embodiment.

As in a modification illustrated in FIG. 16, it is possible to employ a structure in which a protrusion 56A is provided to the cage main body 34. In the structure of this modification, for example, the protrusion 56A comes from below into contact with the heat sink 36 at the first position P1 and supports the heat sink 36 at the separate position PA. In addition, a hollow 62A in which the protrusion 56A is inserted while the heat sink 36 is located at the second position P2 is provided to the heat sink 36. When the protrusion 56A is inserted in the hollow 62A, the supporting of the heat sink 36 is released to allow the heat sink 36 to move to the contact position PB. In the structure of this modification, in place of the first leaf spring 58 illustrated in FIG. 6 and so on, a spring (a spring in any form such as a leaf spring or a coil spring) which causes the heat sink 36 to move toward the contact position PB may be provided as the first spring.

In the present embodiment, the second leaf spring 60 is provided. The second leaf spring 60 is one example of an inclined plate, and the claw piece 56 comes into contact with the upper surface of the second leaf spring 60 while the heat sink 36 is sliding from the first position P1 toward the second position P2. The upper surface of the second leaf spring 60 is inclined toward the inner side of the cage main body 34 while extending from the insertion slot 44 side to the bored portion 62. Even a structure not including such an inclined plate may employ a structure that allows the claw piece 56 to reach the bored portion 62 along with the operation of sliding of the heat sink 36 from the first position P1 to the second position P2. In the case of a structure including an inclined plate as in the present embodiment, the claw piece 56 is smoothly guided to the bored portion 62 by the inclined plate while the heat sink 36 is sliding from the first position P1 to the second position P2.

With the second leaf spring 60 being one example of the inclined plate, the claw piece 56 comes into contact from the outer side of the cage main body 34 (from above). When the second leaf spring 60 bows to the inner side of the cage main body 34, the second leaf spring 60 exerts on the claw piece 56 a spring force in the direction outward of the cage main body 34. Thus, when the heat sink 36 slides between the first position P1 and the second position P2, the claw piece 56 is held between the first leaf spring 58 and the second leaf spring 60 in the plate-thickness direction (the vertical direction), which stabilizes the sliding of the heat sink 36.

In the present embodiment, the bored portion 62 is the gap between the tip end of the first leaf spring 58 and the tip end of the second leaf spring 60. In other words, the second leaf spring 60, the bored portion 62, and the first leaf spring 58 are arranged consecutively in this order from the insertion slot 44 side of the cage main body 34. Thus, the claw piece 56 is guided to the bored portion 62 from the second leaf spring 60 as the heat sink 36 slides from the first position P1 to the second position P2. Then, the operation of bringing the tip end portion of the claw piece 56 after passing through the bored portion 62 into contact with the first leaf spring 58 is carried out by a single operation of sliding the heat sink 36 from the first position P1 to the second position P2.

The first leaf spring 58 is one example of a first spring, and the second leaf spring 60 is one example of a second spring. The first spring and the second spring are not limited to such leaf springs, but may be, for example, coil springs. In the present embodiment, the first leaf spring 58 and the second leaf spring 60 are formed by bending the portions of the plate material for the upper wall 48U of the cage main body 34. Thus, members other than the cage main body 34 are not used to form the first spring and the second spring, which does not lead to an increase in the number of parts.

In the present embodiment, there are four first leaf springs 58, and multiple (two) first leaf springs 58 are arranged in the upper wall 48U in the insertion direction of the module 38 as illustrated in FIG. 4. In addition, as illustrated in FIG. 5, multiple (two) first leaf spring 58 are also arranged in the upper wall 48U in the direction orthogonal to the insertion direction of the module 38. Similarly, there are also four second leaf springs 60. In the upper wall 48U, multiple (two) second leaf springs 60 are arranged in the insertion direction of the module 38, and multiple (two) second leaf springs 60 are also arranged in the direction orthogonal to the insertion direction of the module 38. This structure enables the spring force to be exerted more equally over the entire heat sink 36 than a structure including, for example, only one first leaf spring 58 and one second leaf spring 60.

In the above-described embodiment, the description is provided for the example in which the heat sink 36 is arranged only on the upper wall 48U among the four side walls 48 of the cage main body 34. In this regards, the heat sink 36 may be arranged on at least either one of the right wall 48R and the left wall 48L.

The electronic device 40 discussed herein is, for example, a server or computer. Examples of the electronic device 40 besides them are a signal converter which performs conversion of input signals and outputs the resultant signals, a signal relay device which relays electronic signals and optical signals, and so on.

Hereinabove, the embodiment of the technique of the present disclosure is described. It is to be noted that the technique of the present disclosure is not limited to the above embodiment, but may be modified in various embodiments besides the above embodiment without departing from the spirit of the present disclosure, as a matter of course.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A connector cage comprising:
   a cage including an insertion slot from which a module is inserted into the cage;
   a heat sink which is arranged on a wall of the cage, the heat sink configured to be positioned at a contact position and a separate position with respect to the inserted module, move between the contact position and the separate position, and slide in an insertion direction in which the module is inserted in the cage;
   a first spring which causes the heat sink to move to the contact position;
   a protrusion provided on the wall or the heat sink, and which supports the heat sink at the separate position by being in contact with the heat sink or the wall;
   a push plate extending from the heat sink, and which is pushed by the inserted module to cause the heat sink to slide to a back side of the cage in the insertion direction; and
   a hollow which is provided in the heat sink or the wall and the protrusion moves into the hollow as a result of sliding of the heat sink to the back side, so that the protrusion no longer supports the heat sink.

2. The connector cage according to claim 1, wherein the protrusion is a claw piece which is extended from the heat sink and inclined to the wall while extending from the insertion slot side toward the back side.

3. The connector cage according to claim 2, wherein the first spring is a first leaf spring which pushes the claw piece.

4. The connector cage according to claim 3, wherein the hollow is bored through the wall.

5. The connector cage according to claim 3, further comprising an inclined plate arranged on the wall, and inclined to an inner side of the cage while extending from the insertion slot side to the hollow.

6. The connector cage according to claim 5, wherein the inclined plate is a second leaf spring which bows to the inner side of the cage when the protrusion comes into contact with the second leaf spring from an outer side of the cage.

7. The connector cage according to claim 6, wherein the hollow is a gap between a tip end of the first leaf spring and a tip end of the second leaf spring.

8. The connector cage according to claim 6, wherein the first leaf spring and the second leaf spring are formed by bending portions of a plate material for the wall.

9. The connector cage according to claim 7, wherein the first leaf spring and the second leaf spring are formed by bending portions of a plate material for the wall.

10. The connector cage according to claim 6, wherein a plurality of the first leaf spring and a plurality of the second leaf spring are arranged in each of the insertion direction of the module, and a width direction orthogonal to the insertion direction.

11. The connector cage according to claim 1, further comprising an ejection spring which causes the heat sink to move toward the insertion slot.

12. The connector cage according to claim 11, wherein the ejection spring is in contact with the push plate and pushes the heat sink toward the insertion slot.

13. The connector cage according to claim 12, wherein the ejection spring is arranged between a back wall of the cage and the push plate.

14. The connector cage according to claim 1, further comprising a lock piece which locks the module inserted into the cage.

15. The connector cage according to claim 1, wherein the push plate is provided on the back side of the heat sink.

16. An electronic device comprising:
a cabinet;
a connector cage in the cabinet and including an insertion slot from which a module is inserted into the connector cage, the insertion slot being exposed to outside of the cabinet;
a heat sink which is arranged on a wall of the connector cage, the heat sink configured to be positioned at a contact position and a separate position with respect to the inserted module, move between the contact position and the separate position, and slide in an insertion direction in which the module is inserted in the cage;
a first spring which causes the heat sink to move toward the contact position;
a protrusion provided on the wall or the heat sink, and which supports the heat sink at the separate position by being in contact with the heat sink or the wall;
a push plate extending from the heat sink, and which is pushed by the inserted module to cause the heat sink to slide to a back side of the connector cage in the insertion direction; and
a hollow which is provided in the heat sink or the wall and the protrusion moves into the hollow as a result of sliding of the heat sink to the back side, so that the protrusion no long supports the heat sink.

17. A connector cage comprising:
a cage main body including an insertion slot for a module to be inserted;
a heat sink configured to be positioned at a first position where a heat receiving surface of the heat sink contacts a corresponding surface of the cage main body and a second position where the heat receiving surface does not contact the corresponding surface;
the heat sink configured to move between the first position and the second position, and slide in an insertion direction that is a direction the module is inserted in the cage main body;
a first spring configured to cause the heat sink to move to the first position;
a protrusion provided on a wall of the cage main body, the protrusion supports the heat sink when the heat sink is at the second position;
a push plate extending from the heat sink, and the push plate is pushed by the inserted module to cause the heat sink to slide to a back side of the cage main body in the insertion direction; and
an opening provided in the wall and the protrusion moves into the opening as a result of the sliding of the heat sink to the first position, the protrusion does not support the heat sink when the heat sink is at the first position.

* * * * *